(12) United States Patent  
Weiss

(10) Patent No.: US 7,180,037 B2  
(45) Date of Patent: Feb. 20, 2007

(54) HEATER WIRE AND CONTROL THEREFOR

(75) Inventor: John W. Weiss, Oakdale, NY (US)

(73) Assignee: Weiss Controls, Inc., Holtsville, NY (US)

( * ) Notice: Subject to any disclaimer, the term of this patent is extended or adjusted under 35 U.S.C. 154(b) by 0 days.

(21) Appl. No.: 11/135,247

(22) Filed: May 23, 2005

(65) Prior Publication Data

US 2005/0263518 A1 Dec. 1, 2005

Related U.S. Application Data

(60) Provisional application No. 60/574,650, filed on May 26, 2004.

(51) Int. Cl.
*H05B 1/02* (2006.01)

(52) U.S. Cl. .................... 219/505; 219/481; 219/212; 219/492; 324/511

(58) Field of Classification Search ........... 219/481, 219/494, 497, 501, 505, 212, 504; 324/511; 361/45

See application file for complete search history.

(56) References Cited

U.S. PATENT DOCUMENTS

| | | | |
|---|---|---|---|
| 5,861,610 A | 1/1999 | Weiss | 219/497 |
| 6,222,162 B1 | 4/2001 | Keane | 219/481 |
| 6,310,332 B1 * | 10/2001 | Gerrard | 219/505 |

* cited by examiner

*Primary Examiner*—Mark Paschall
(74) *Attorney, Agent, or Firm*—Gerald T. Bodner

(57) ABSTRACT

An improved control device and method is usable with flexible heating wire having a conductive core with a Negative Temperature Coefficient (NTC) layer and a helically wound heater conductor within an insulative outer sheath. The conductive core is coupled to a control circuit, a phase shift relative to the AC power supply being indicative of the temperature of the wire. The nonlinear nature of the NTC layer enhances the detection of local hot spots anywhere along the length of the wire. Precise temperature measurement is achieved by measuring the time differences between two zero crossings and the power to the heater compensates for abnormal use such as bunching of the heater wire. The control of the heater wire is particularly suitable for use with appliances such as heating pads and electric blankets.

27 Claims, 11 Drawing Sheets

HEATER WIRE AND CONTROL THEREFOR

CROSS REFERENCE TO RELATED APPLICATION

This application is related to U.S. provisional application Ser. No. 60/574,650, filed on May 26, 2004, and entitled "Heater Wire Control", the disclosure of which is incorporated herein by reference. This application claims the benefit of priority under 35 U.S.C. 119 to the aforementioned related provisional application.

COPYRIGHT NOTICE

A portion of the disclosure of this patent document contains material that is subject to copyright protection. The copyright owner has no objection to the facsimile reproduction by anyone of the patent disclosure, as it appears in the U.S. Patent and Trademark Office patent files or records, but otherwise reserves all copyright rights whatsoever.

BACKGROUND OF THE INVENTION

1. Field of the Invention

Modem heating pads and electronic blankets have heater wires that do not require separate thermostats. They fall into two basic types: a heater wire having a PTC heating layer disposed between two conductors that has an increased resistance with temperature increase so that the wire is self limiting and not subject to hot spots; or a heater wire that provides a feedback signal to a control for monitoring temperature and detecting local hot spots. This subject invention relates to the latter, having a feedback signal that is both responsive to the temperature of the wire and has increased sensitivity when portions of the wire are at a temperature that is higher than the average temperature.

2. Description of the Prior Art

The first successful invention that uses a feedback signal for temperature control concurrently with a voltage that also indicates the occurrence of a hot spot that deteriorates the insulation between a heater conductor and a sensor wire was invented by this inventor and is described in U.S. Pat. No. 5,861,610. A Positive Temperature Coefficient (PTC) Nickel alloy sensor wire is counter wound around a heater wire with an inner insulation therebetween. The current leakage through the insulation provides an electrical couple between the sensor and heater wire. The resistance of the sensor wire is measured and used for temperature control. An AC voltage present on the sensor wire indicates the existence of a breakdown in the separating insulation. Where Poly Vinyl Chloride (PVC) is used as the separating layer, small leakage would occur at about 160° C. Where polyethylene is used, the layer melts at 130° C. and contact is made between the heater and sensor wire. Either case would signal the control unit to disconnect the power to the heater conductor.

A similar technique was patented by Gerrard and is disclosed in U.S. Pat. No. 6,310,322, who used the second conductor as a heater with the insulation between having an enhanced NTC (Negative Temperature Coefficient) characteristic. The two heating conductors are connected through a diode so that leakage through the NTC layer introduces the negative half cycle, which presence is caused to terminate the power. In a second embodiment, the second conductor is a PTC sensor wire, such as disclosed in the aforementioned U.S. Pat. No. 5,861,610.

A smaller more flexible heater wire design is taught by Barry Keane in U.S. Pat. No. 6,222,162 that uses a single conductor of a PTC alloy for both heating and temperature sensing. In the Keene device, no attempt is made to detect local hot spots that occur from bunching or folding. Only the average temperature is used to control the wire temperature.

All of the above references measuring resistances within the wire by voltage comparison techniques. The resistance changes are generally small and much attention is paid to tolerances in the application of these techniques in production.

OBJECTS AND SUMMARY OF THE INVENTION

It is an object of the present invention to provide a more flexible heating wire that is self-healing in the manner of control to prevent any portion of the heating wire from overheating and causing permanent damage due to abnormal or misuse.

It is a further object of the invention to provide a control apparatus that is tolerant to variations in the length and manufacturing variations that control the calibration of the temperature sensing.

It is still a further object of the invention to control the heater wire according to the hottest portion of the wire as opposed to the traditional average wire temperature.

It is another object of the invention to have a control system that is sensitive to conditions of overheat at any section along the length of the wire.

It is also an object of the invention to control the temperature and safety of the heater wire with a mechanism that is time based and not dependent on voltage comparison methods.

It is also an object of the invention to provide a high degree of resolution in the temperature measurement of the wire.

In accordance with one form of the invention, a heater wire formed with a tinsel wire core has a polyethylene insulation separating the tinsel core from a helically wound heater conductor. The heater wire is connected to opposite polarity main voltage with a solid state switch such as a triac to control the power input to the heater conductor. One or both ends of the conductive core are attached electrically to a junction of a capacitor and resistor divider circuit. The opposite end of the capacitor is connected to the neutral side and the opposite end of the resistor is connected to the high voltage, 120 VAC, input side. In this way, the junction of the resistor, capacitor and conductive core is in a phase shift relation to the main power of about 45° phase angle.

Power is applied to the heater in a duty cycle with on and off times representative of various heat settings. For example, the high setting would have 24 seconds on and 6 seconds off, and the medium setting would have 14 seconds on and 16 seconds off. In the event of an overheat condition, the polyethylene insulation would melt and the heater shorts to the core, effectively shorting the voltage divider capacitor and resistor and forcing the sensing phase angle to become coincident with the main power.

The controller senses the zero cross of both the main power and the capacitive resistive junction and determines if the junction phase is within a band time width relative to the main power zero cross. If not, then the control does not drive the solid state power switch.

In a second embodiment, the insulative layer is a "doped" PVC that has a Negative Temperature Coefficient (NTC) of resistance, in that, as the temperature increases, the resistance of the insulative layer decreases. The core is connected to the junction of a capacitor and resistor divider as in the first form of the present invention. As the temperature increases, the insulative resistance decreases and causes the phase angle of the junction to approach the power input phase. A control device has two zero cross circuits and measures the time difference between the two zero crossings and controls the heater wire by switching power until a predetermined time difference between the two zero crosses are obtained for each of a multitude of settings.

One form of the present invention involves the combination of a heater wire and a control circuit for the heater wire. The heater wire preferably includes a heating conductor having a predetermined resistance, a sensing conductor, a polymer layer interposed between the heating conductor and the sensing conductor and an outer insulative layer covering the heating conductor, polymer layer and sensing conductor. In a preferred form, the polymer layer of the heater wire includes polyethylene having a melt temperature of less than about 155 degrees C. In another form, the polymer layer of the heater wire is semi-conductive and has either a negative temperature coefficient (NTC) of resistance or a positive temperature coefficient (PTC) of resistance.

The control circuit for controlling an AC (alternating current) power signal applied to the heater wire preferably includes a capacitor, the capacitor being coupleable to one polarity of the AC power signal. A resistor is connected in series with the capacitor and to an opposite polarity of the AC power signal. The resistor is connected to the capacitor to define a junction thereat. One end of the sensing conductor is coupled to the junction of the resistor and capacitor. The junction exhibits a phase shifted AC power signal when power is applied to the heater wire and control circuit.

The control circuit further preferably includes a first zero cross detector which detects the zero crossing of the AC power signal and generates a first zero cross signal in response thereto, and a second zero cross detector which detects the zero crossing of the phase shifted AC power signal exhibited at the junction of the resistor and capacitor and which generates a second zero cross signal in response thereto.

The control circuit also preferably includes a time difference determinator circuit, e.g., a subtractor circuit, which is responsive to the first zero cross signal and the second zero cross signal and which determines the time difference between the zero crossing of the AC power signal and the zero crossing of the phase shifted AC power signal and generates a control signal in response thereto. The control circuit further preferably includes a switch which is responsive to the control signal and which controls the duty cycle of the AC power signal provided to the heater wire in response thereto.

In another form, the present invention involves the combination of a heater wire and a control circuit for the heater wire. The heater wire preferably includes a heating conductor having a predetermined resistance, a sensing conductor, a polymer layer interposed between the heating conductor and the sensing conductor and an outer insulative layer covering the heating conductor, polymer layer and sensing conductor. In a preferred form, the polymer layer of the heater wire includes polyethylene having a melt temperature of less than about 155 degrees C. In another form, the polymer layer of the heater wire is semi-conductive and has either a negative temperature coefficient (NTC) of resistance or a positive temperature coefficient (PTC) of resistance. Also, the heating conductor of the heater wire may have a positive temperature coefficient (PTC) of resistance.

The control circuit for controlling an AC (alternating current) power signal applied to the heater wire preferably includes a first capacitor, the first capacitor being coupleable to one polarity of the AC power signal. A first resistor is connected in series with the capacitor and to an opposite polarity of the AC power signal. The first resistor is connected to the first capacitor to define a junction thereat. One end of the sensing conductor is coupled to the junction of the first resistor and first capacitor. The junction exhibits a phase shifted AC power signal when power is applied to the heater wire and control circuit.

The control circuit further preferably includes a first zero cross detector which detects the zero crossing of the AC power signal and generates a first zero cross signal in response thereto, and a second zero cross detector which detects the zero crossing of the phase shifted AC power signal exhibited at the junction of the resistor and capacitor and which generates a second zero cross signal in response thereto.

The control circuit of this embodiment further includes a second capacitor and a second resistor. The second resistor is connected in series with the second capacitor to define a series connection therewith. The series connection has a first end and an opposite second end. The first end of the series connection of the second capacitor and the second resistor is coupleable to the one polarity of the AC power signal, and the second end of the series connection of the second capacitor and the second resistor is coupleable to the heating conductor of the heater wire and defining therewith a second junction. The second junction exhibits a second phase shifted AC power signal when power is applied to the heater wire and control signal. A third zero cross detector detects the zero crossing of the second phase shifted AC power signal exhibited at the second junction of the series connection of the second capacitor and the second resistor and generates a third zero cross signal in response thereto.

The control circuit also preferably includes a time difference determinator circuit, e.g., a subtractor circuit, which is responsive to the first zero cross signal and the second zero cross signal and which determines the time difference between the zero crossing of the AC power signal and the zero crossing of the first phase shifted AC power signal, and which is further responsive to the first zero cross signal and the third zero cross signal and which determines the time difference between the zero crossing of the AC power signal and the zero crossing of the second phase shifted AC power signal, and generates a control signal in response thereto. The control circuit further preferably includes a switch which is responsive to the control signal and which controls the duty cycle of the AC power signal provided to the heater wire in response thereto. Preferably the time difference determinator circuit includes a microprocessor which determines the time difference between the zero crossing of the AC power signal and the zero crossing of the first phase shifted AC power signal for determining the temperature of the heater wire relative to the hottest portion of the heater wire, and/or which determines the time difference between the zero crossing of the AC power signal and the zero crossing of the second phase shifted AC power signal for determining the average temperature of the heater wire.

In another form of the present invention, a control circuit controls an AC (alternating current) power signal applied to a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor. The control circuit includes a phase shift circuit coupled to the sensing conductor of the heater wire which generates a phase shifted AC power signal, a first zero cross detector which detects the zero crossing of the AC power signal and generates a first zero cross signal in response thereto, and a second zero cross detector which detects the zero crossing of the phase shifted AC power signal and which generates a second zero cross signal in response thereto.

The control circuit further includes a time difference determinator circuit, e.g., a subtractor circuit, which is responsive to the first zero cross signal and the second zero cross signal and which determines if the time difference between the zero crossing of the AC power signal and the zero crossing of the phase shifted AC power signal is approximately zero, and which generates a control signal in response thereto. The control circuit also includes a switch which is responsive to the control signal and which limits the AC power signal provided to the heater wire in response thereto.

In yet another form, the present invention involves the combination of a heater wire and a control circuit for the heater wire. The heater wire preferably includes a heating conductor having a predetermined resistance, a sensing conductor, a polymer layer interposed between the heating conductor and the sensing conductor and an outer insulative layer covering the heating conductor, polymer layer and sensing conductor. In a preferred form, the polymer layer of the heater wire includes polyethylene having a melt temperature of less than about 155 degrees C. In another form, the polymer layer of the heater wire is semi-conductive and has either a negative temperature coefficient (NTC) of resistance or a positive temperature coefficient (PTC) of resistance.

The control circuit for controlling an AC (alternating current) power signal applied to the heater wire preferably includes a capacitor, the capacitor being coupleable to one polarity of the AC power signal. A resistor is connected in series with the capacitor and to an opposite polarity of the AC power signal. The resistor is connected to the capacitor to define a junction thereat. One end of the sensing conductor is coupled to the junction of the resistor and capacitor. The junction exhibits a phase shifted AC power signal when power is applied to the heater wire and control circuit.

The control circuit further preferably includes a first zero cross detector which detects the zero crossing of the AC power signal and generates a first zero cross signal in response thereto, and a second zero cross detector which detects the zero crossing of the phase shifted AC power signal exhibited at the junction of the resistor and capacitor and which generates a second zero cross signal in response thereto.

The control circuit also preferably includes a time difference determinator circuit, e.g., a subtractor circuit, which is responsive to the first zero cross signal and the second zero cross signal and which determines if the time difference between the zero crossing of the AC power signal and the zero crossing of the phase shifted AC power signal is approximately zero and generates a control signal in response thereto. The control circuit further preferably includes a switch which is responsive to the control signal and which limits the AC power signal provided to the heater wire in response thereto.

The present invention further includes a method of monitoring and controlling a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor. The method preferably includes the steps of providing an AC (alternating current) power signal to the heater wire, phase shifting the AC power signal in response to a change in resistance of the polymer layer of the heater wire and generating a phase shifted AC power signal in response thereto, and detecting the zero crossing of the AC power signal and generating a first zero crossing signal.

The method further includes the steps of detecting the zero crossing of the phase shifted AC power signal and generating a second zero crossing signal in response thereto, determining the time difference between the zero crossing of the AC power signal and the zero crossing of the phase shifted AC power signal in response to the first zero crossing signal and the second zero crossing signal and generating a control signal in response thereto, and controlling the duty cycle of the AC power signal provided to the heater wire in response to the control signal.

In yet another form, the present invention includes a method of monitoring and controlling a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor. The method preferably includes the steps of providing an AC (alternating current) power signal to the heater wire, phase shifting the AC power signal in response to a change in resistance of the polymer layer of the heater wire and generating a first phase shifted AC power signal in response thereto, and phase shifting the AC power signal in response to a change in resistance of the heating conductor of the heater wire and generating a second phase shifted AC power signal in response thereto.

The method further includes the steps of detecting the zero crossing of the AC power signal and generating a first zero crossing signal, detecting the zero crossing of the first phase shifted AC power signal and generating a second zero crossing signal in response thereto, and detecting the zero crossing of the second phase shifted AC power signal and generating a third zero crossing signal in response thereto.

The method further includes the steps of determining the time difference between the zero crossing of the AC power signal and the zero crossing of the first phase shifted AC power signal in response to the first zero crossing signal and the second zero crossing signal, and determining the time difference between the zero crossing of the AC power signal and the zero crossing of the second phase shifted AC power signal in response to the first zero crossing signal and the third zero crossing signal, and generating a control signal in response thereto, and controlling the duty cycle of the AC power signal provided to the heater wire in response to the control signal.

In still another form, the present invention is a method of monitoring and controlling a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor. The method preferably includes the steps of providing an AC (alternating current) power signal to the heater wire, generating a phase shifted AC power signal at a connection to the sensing conductor of the heater wire, and detecting the zero crossing of the AC power signal and generating a first zero crossing signal.

The method further includes the steps of detecting the zero crossing of the phase shifted AC power signal and generating a second zero crossing signal in response thereto, determining if the time difference between the zero crossing of the AC power signal and the zero crossing of the phase shifted AC power signal in response to the first zero crossing signal and the second zero crossing signal is approximately zero and generating a control signal in response thereto. The method further includes the step of limiting the AC power signal provided to the heater wire in response to the control signal.

The advantages of this approach to temperature and safety control of appliances that employ flexible heating wire will become apparent by the following description of the illustrations of the included embodiments of the present invention.

DETAILED DESCRIPTION OF THE INVENTION

Figure 1:
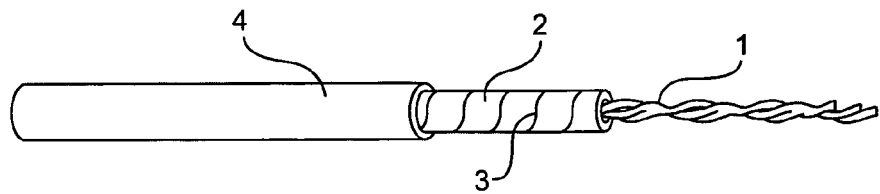
FIG. 1 is a perspective view of the wire used in the preferred embodiments of the invention.

FIG. 1 illustrates the construction of the flexible heater wire used in accordance with the present invention. An elongated wire has a conductive core 1 that has multiple tinsel wire ribbons intertwined within a polyester fiber. The core has a low resistance of 0.3 ohms per ft. Outside of the core is extruded a first polymer insulative layer 2 that has a desired melt temperature of about 140° C. This plastic compound can be made of low or high density polyethylene. The heater conductor 3 is helically wound around the first insulative layer, the alloy, gage, and turns per inch of which are selected to provide the desired resistance per foot that produces the wattage needed for heating. The watt density is carefully chosen according to the product. In a heating pad, a wire design of 2 watts per foot, and in an electric blanket, a watt density of 1.2 watts per foot are desirable. A second insulative layer 4 is extruded over the wound assembly and provides electrical insulation to the outside world. PVC with a 105° C. rating is generally used for the second outer insulative layer. The wall thickness is 0.020 inches. It is noted that the low resistance core at the central axis of the wire results in the most flexible form of heating wire that has two conductors. Such a wire is available from Thermocable LTD, and is similar to their model number TD600.

Figure 2:
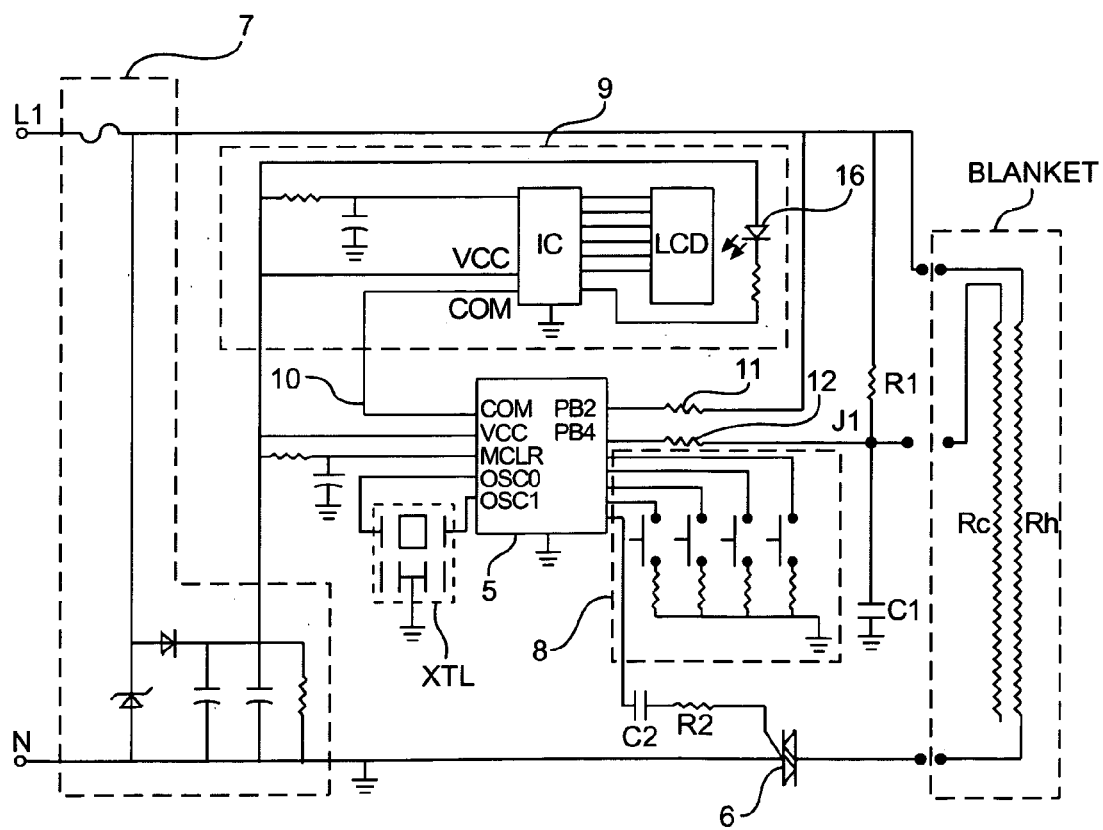
FIG. 2 is an electrical schematic diagram illustrating one embodiment of the wire and control circuit.

Referring to FIG. 2, the heater conductor is represented by the elongated resistor Rh and the core resistance Rc is shown in parallel relation thereto. One end of the core resistor Rc is electrically connected to a voltage divider comprised of a capacitor C1 and resistor R1 disposed between the opposite polarities of the main AC power source. With component values of 0.12 uF for C1 and 22 KΩ for R1 across a 120 volt 60 Hertz line, a phase shift appears at the junction J1. The first polymer layer 2 is in contact longitudinally along the full length of the heater wire, as seen in FIG. 1. A local hot spot in the wire that causes a melt down of the first polymer layer brings the core into contact with the heater that shorts out the capacitor C1 and resistor R1, forcing the phase of the junction to zero degrees (0°) in coincidence with the main power supply.

An integrated circuit 5, which is preferably a microprocessor (microcontroller) such as Part No. MDT2010ES manufactured by Micon Design Technology Co., Ltd. of Taipei, Taiwan, is configured to have two zero cross detector circuits. The first zero cross detector circuit has a current limiting resistor 11 of preferably about 4.7 MΩ to the 120 VAC to measure the zero crossing of the main AC power supply. The second zero cross detector circuit has preferably about a 3.3 MΩ resistor 12 to the core junction to measure the zero crossing of the junction J1. Alternatively, the resistor 12 may have a lower value if the voltage was clamped by a diode (not shown) to Vcc and a diode (not shown) to ground to form a clipping circuit which provide a square wave signal as seen by integrated circuit 5.

The integrated circuit 5 controls the power to the heater resistor Rh by switching on a triac 6. Current is supplied to the control gate of the triac 6 by a pulse coordinated at every power zero crossing. A capacitor C2 and resistor R2 connected in series with one another and to the control gate of the triac 6 insure that only a pulse at the zero crossings will operate the triac 6. In the control program, a timer, or counter, resets at the power zero crossing and terminates at the Junction J1 zero crossing. Normally, the time is about 4 milliseconds. As long as the time is within an established time tolerance, the next zero cross pulse drive is sent to the triac gate circuit. A more detailed description of the control logic will be discussed in relation to the preferred embodiment. The power supply circuit 7 provides a stable 5.6 volts to the low voltage circuit, the details of which are well known to those skilled in the art. The user interface 8 includes input switches, shown in FIG. 2 as left, right, down and up, that are used for power on and setting selection. The heat setting selects the proportion of heating to the heater. An increase in the duty cycle increases the temperature that the wire attains and thus a particular comfort level is achieved. An LCD (liquid crystal display) driver circuit 9 receives a digital instruction from the integrated circuit 5 via digital communication line 10. The display is backlighted and has digits and icons that indicate the control of the product. A numeric between 1 and 9 plus H indicates the heat setting, and icons such as mode and auto off timers are also displayed for the user. The display drive can also be incorporated in an integrated circuit that has a display driver built in. The display also shows error codes and can blink to alert the user of an error condition such as power off from sensing an overheated wire. The display drive integrated circuit (IC) may be implemented by using a separate conventional integrated circuit, as is well known to one skilled in the art, or may be implemented as part of integrated circuit 5, such as the aforementioned microprocessor (microcontroller) Part No. MDT2010ES. The LCD may also be a standard, off-the-shelf display or may be custom-made.

In the second embodiment, the first insulative layer as seen in FIG. 1, herein referred to as 2', is comprised of a polymer compound that is "doped" to have a Negative Temperature Coefficient (NTC) wherein the resistance of the layer decreases non-linearly with increasing temperature. PVC has a slight NTC property, and with the addition of additives, the effect is more pronounced. The NTC layer 2' acts as a variable resistance between the heater conductor 3 and the conductive core 1 along the full length of the wire. Unlike the low melt characteristic of the first insulative layer 2 as described in the first embodiment, the NTC nature of the first insulative layer 2' of this second embodiment changes the resistive/capacitive voltage divider in a manner to change the phase shift of the junction J1 relative to temperature. In effect, the circuit, having a fixed resistor R1 in series with a fixed capacitor C1 across the main line AC input and having the variable resistance of the NTC layer 2' in parallel with the fixed resistor R1, becomes a "phase shifter", changing the phase at the junction J1 according to the resistance of the NTC layer and thus according to the wire temperature. With the low melt insulative layer 2, as described in the first embodiment, a direct short or switch between the heater and core causes an abrupt phase shift. With the NTC layer 2' in this second embodiment, a continuously changing phase shift occurs at the core junction J1 that is related to the temperature of the NTC layer. Temperature control is achieved by the measured time differences between the zero crossing of the main power supply and that of the zero crossing of the junction J1.

Figure 3:
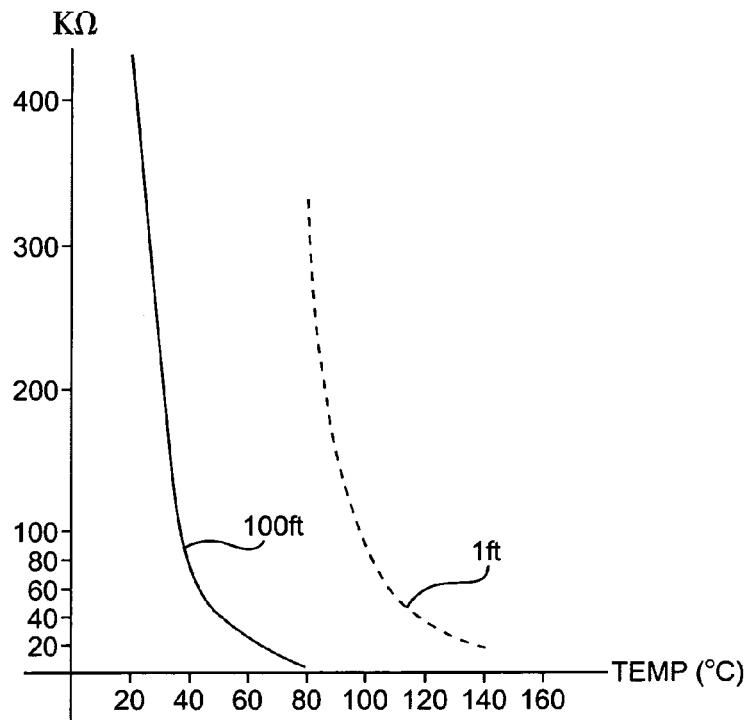
FIG. 3 is a plot of the resistance vs. temperature of the NTC layer for a wire length of 100 ft.

The temperature resistance relation as shown in FIG. 3 exhibits a non-linear change with temperature. The solid curve describes the resistance temperature function for a 100 foot section of wire with the entire wire at the same temperature, whereas the dashed curve represents only one foot of wire at an elevated temperature. It is noted that the total resistance does not represent the average temperature of the wire, since the resistance is inverse and non-linearly related to temperature, and the sensing mechanism is in a parallel configuration. A local wire temperature (the dashed curve) that is significantly higher than the average temperature becomes a dominant contributor to the total resistance. The sensitivity to a local hot spot can be demonstrated by calculation. For example, it can be seen from the 100 ft. curve of FIG. 3 a wire operating at 40° C. having a constant temperature along the full length has an impedance of 96 K$\Omega$. Now consider the effect of an abnormal use, such as when an electric blanket is folded, causing a one foot section of the wire to retain heat, elevating the temperature of that one foot of wire to 140° C. From FIG. 3, the impedance of the hot spot is 31 K$\Omega$. The total resistance is calculated as two parallel impedances of 96 K$\Omega$ and 31 K$\Omega$, resulting in 23.4 K$\Omega$. This result is lower than a selected minimum value at 60° C. of 24 K$\Omega$ that corresponds to the maximum heat setting. The control would have reduced the power before this hot spot condition was allowed to occur. The 100 foot curve of FIG. 3 represents the impedance of the NTC layer in the normal design temperature range. The one foot curve represents the impedance superimposed upon the 100 foot impedance value due to a local hot spot. It is the combination of the inverse non-linear relation of resistance to temperature of the NTC layer and the parallel configuration of the resistance that provides a means for detecting hot spots.

Figure 4:
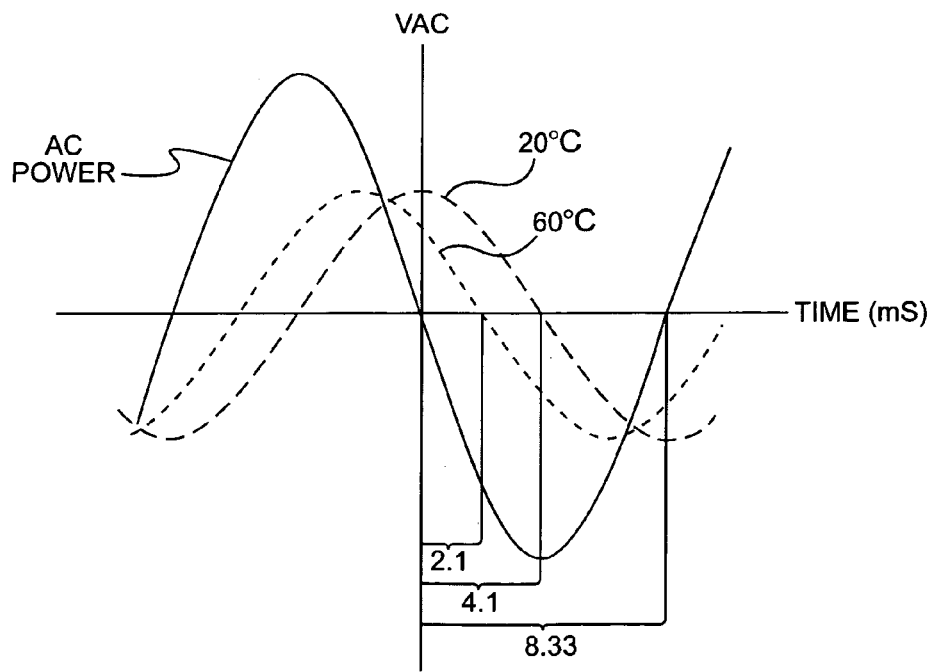
FIG. 4 is a graph showing a time based alternating current waveform illustrating the phase shift between the power input and the sensor junction.

The combination of a large change of impedance with temperature plus a high resolution of measurement accuracy alleviates the concern for calibration due to the manufacturing tolerances of the wire. Referring again to FIG. 3, a five percent (5%) tolerance in the wire results in an error of only 1.4° C. at the maximum design temperature of 60° C. The resolution of the measurement can be illustrated by considering the phase shift over the entire range span, as shown in FIG. 4. The solid sine wave curve is the main 120 VAC 60 Hz power, the long dashed sine wave curve corresponds to the AC volts at the signal junction for the wire at 20° C. having a zero crossing at 4.1 milliseconds after the main power zero crossing, and the short dashed sine wave curve corresponds to the AC volts at the signal junction for the wire at 60° C. having a zero crossing at 2.1 milliseconds after the main power zero crossing. The range span of 40° C. from 20° C. to 60° C. has a time span of 4.1–2.1 milliseconds, or a 2.0 millisecond change. The integrated circuit 5, having a standard clock frequency of 32.676 KHz, is a 0.0306 milliseconds per cycle when the system clock is used for a counter/timer to measure the temperature of the NTC layer. Within the full span of 2.0 milliseconds, the counter/timer increments between 0 and 65. At the top of the wire temperature range, the most critical segment, between 50° C. and 60° C., the phase shift is 1 millisecond change or 32 counts, resulting in a measurement resolution of better than one third of 1° C. Clock frequencies of 1 megahertz, as shown by the crystal XTL in the circuit diagram of FIG. 2, are common and can result in an even higher resolution.

Figure 5:
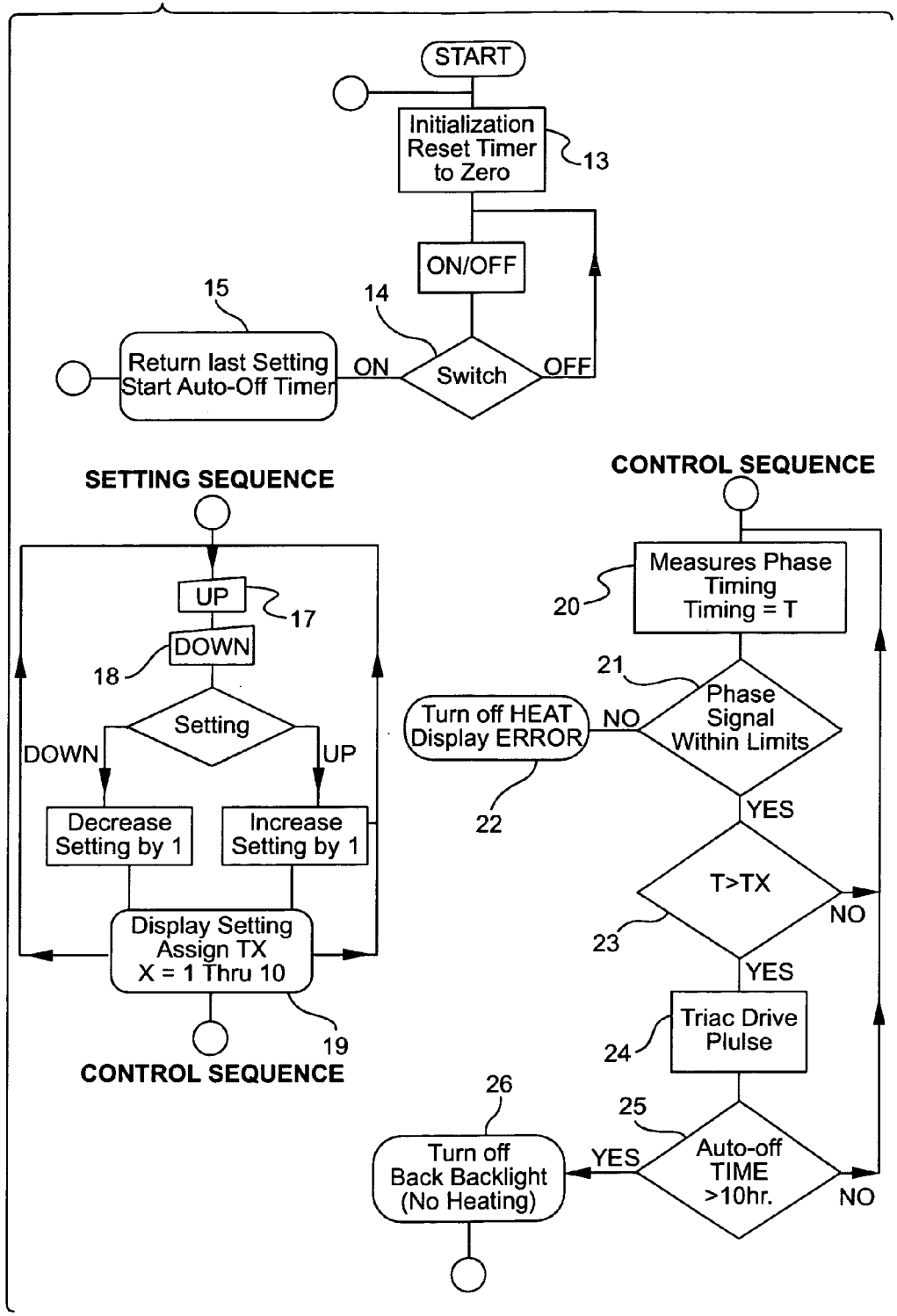
FIG. 5 is a flow chart describing the program routine for sensing temperature and controlling the power to the heater in accordance with the present invention.

The operation of the control device and method of the present invention can best be explained by referring to the flow chart in FIG. 5. Upon power up, the program is initialized, all display segments are activated for two seconds and all timers configured by the programmed microprocessor 5 are set to zero (Block 13). Power is not supplied to the heater until an "on" button switch 8 is pushed (Decision Block 14). At that time, the last settings are recalled, the auto off timer again configured by the programmed microprocessor 5 is started and the initial default settings are set (Block 15). The temperature setting routine allows the user to increment the settings by pressing an up or down button switch 8. When pressed, the setting is incremented up (Block 17) or down (Block 18), and the display (LCD) changes to reflect the current setting and assigns a value Tx for comparison to the timed phase difference (Block 19), as described above. The setting routing runs independently of the control sequence and places the value Tx, where x refers to the setting 1 thru 10, and setting value, into memory. The control sequence starts by measuring the phase shift time T (Block 20) and determining if the time is within limits (Block 21). Should the connector not be properly engaged or the wire shorted, the phase time will be beyond the expected range, and the heating control will be interrupted and the display (LCD) will indicate an error condition (Block 22). After the limit check is met, the actual phase time T is compared to the time stored in memory (Block 23). If T>Tx, the temperature is below the set temperature and the triac drive pulse occurs at the next power zero crossing (Block 24). The auto off timer count down is checked (Block 25), and if the time is greater than a predetermined time such as 10 hours, then the heating control sequence is ended and the display backlight is turned off (Block 26). Otherwise, the routine returns to the phase measurement (Block 20).

An alternate approach to temperature control is to time proportion the heating cycle with established limits of phase time differences. Instead of heating until the time is less than Tx, the heating cycle has predetermined duty cycles and the time difference is compared to Tx, also predetermined as in the previous routine. If the time is less than Tx for any setting, then the heating is interrupted for the duration of a cooling off period. A combination of the two control routines is also possible. A duty cycle with Tx limit is used in the lower settings and control to Tx timing is used for the upper settings. If, for example, the duty cycle averages less than the expected duty cycle for a setting, then it is likely that the blanket, or heating pad, is not operating under uniform temperature conditions, and the duty cycle can be reduced, effectively reducing the temperature of a hot spot. The user in this case can be notified, by displaying an error symbol or icon, of a possible bunching situation or abnormal use.

Referring again to FIG. 1, the wire construction, with the NTC conductive layer 2', is constructed with the core 1 and the heater conductor 3 in elongated close contact. The NTC layer 2' is only 0.0125" thick and as a result, the wire has a capacitive as well as a resistive component. In the critical use range, that is, above 30° C., the resistive component is dominant. Between 20° C. and 30° C., the effect is worth considering. Since the resistive component is relatively high, the sensitivity is reduced.

Figure 6A:
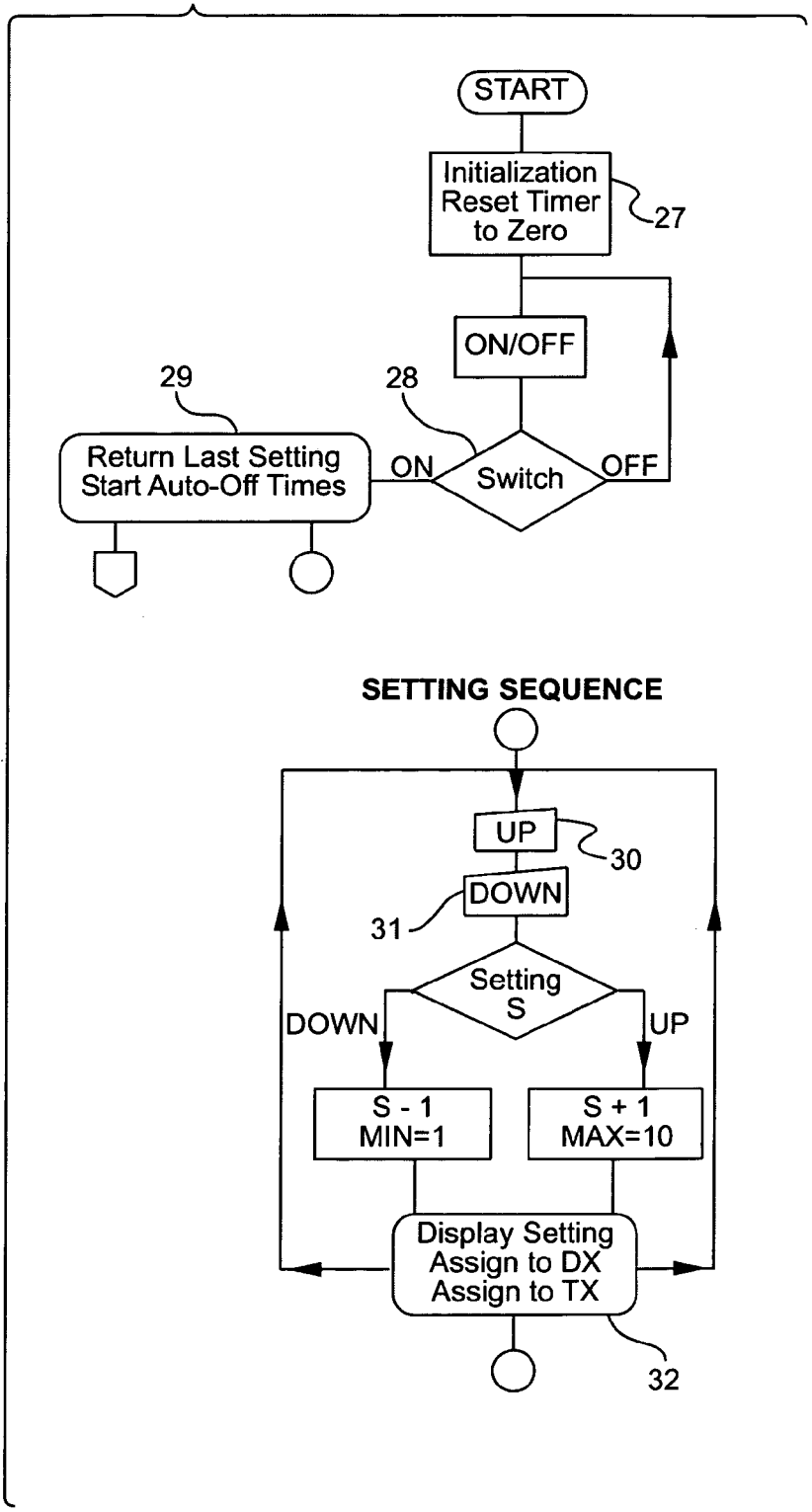
FIG. 6 is a flow chart describing an alternate method of control in accordance with the present invention.

The combination of duty cycle control and phase shift limits mentioned above is an effective method of control to improve the control at the low temperature end. A detailed description of such follows. Referring to the flow chart of FIGS. 6a and 6b, the start sequence is similar to the flow chart of FIG. 5. With initialization (Block 27) at power up, the control is in wait mode until the on/off switch is pressed (Block 28) after turn on, the last settings are recalled and the auto off timer is set to zero and started (Block 29). The setting sequence runs concurrently with the control sequence so that adjustment to the temperature setting can occur at any time after the control is turned on. The settings are changed by the use of up (Block 30) and down (Block 31) button switches 8 to increment the setting from 1 to 10, assigning the minimum expected time difference Tx and also an "on" time Dx according to the setting at Block 32. The on time controls the duty cycle for each setting. For a cycle time of 30 seconds, for example, Dx can range from 3 seconds to 30 seconds for settings from 1 to 10 (i.e., $S_1$–$S_{10}$). Setting 5 may have a value of 15 seconds assigned to Dx. That would result in a 15 second on time and a 15 second off time in the 30 second cycle. A setting of 7 may assign a 21 second on time to Dx.

Figure 6B:
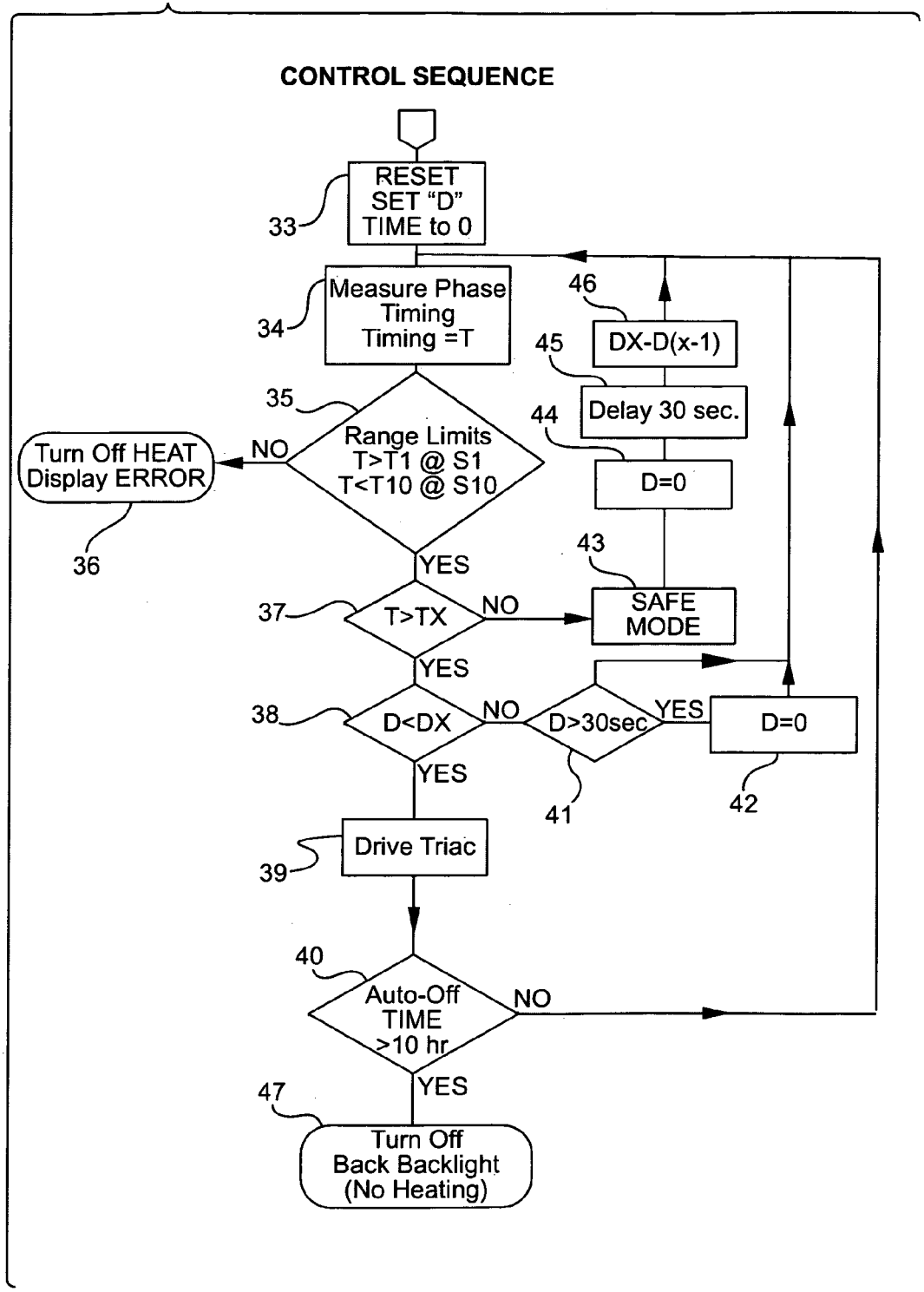

Referring to FIG. 6b, the control sequence is based on the duty cycle established by the assignment of Dx, with temperature limits established by the assignment of the minimum time differences Tx. The first step is to zero the duty cycle and the Auto off timers to zero (Block 33). The control routine starts by measuring the phase time difference T in Block 34. This time is compared to the range limits above and below the temperature range (Block 35). If T is out of range, then the power to the heater is not allowed to turn on and a error message is displayed (Block 36). If T is within limits, then T is compared to Tx (Decision Block 37). Where, as expected, T is greater than Tx, the temperature is under the limits established for the setting and the heating cycle proceeds to the duty cycle control. The on time D is compared to the on time established for the setting Dx (Block 38). If D is less than Dx, then the sequence progresses to drive the Triac (Block 39), adding heat to the heater wire. Next, a comparison is made of the time since the control was turned on to the 10 hour auto off limit. If at Decision Block 40 the auto off timer is less than or equal to 10 hours, the routine continues in the control mode and returns to the phase time measurement (Block 34). If the auto off timer is greater than 10 hours the control turns off (Block 47). In the event that the phase time difference is less than or equal to the time difference limit established for the setting, at Decision Block 37, then an unexpected event such as bunching of the heater wire that caused a hot spot occurred, and the control goes into safe mode (Block 43). Safe mode is designed to operate the heater wire with less power and alert the user to a possible abnormal condition. In this case, the LCD back light will blink to signify that the control is in safe mode.

Referring again to FIG. 2 the LCD is illuminated with a light emitting diode 16 that is controlled by the display driver integrated circuit (IC). Returning again to the flow chart of FIG. 6b, the next step in the safe mode sequence is where the duty cycle timer configured by the programmed microprocessor 5 is set to zero (Block 44) and heating is delayed for 30 seconds (Block 45), one cycle. The duty cycle on time is reduced by one setting (Block 46). If, for example, the setting was on 8 (i.e., $S_8$) and 24 seconds was assigned to the "on" time, then the new "on" time would be the same as for setting 7 (i.e., $S_7$) or 21 seconds, effectively reducing the power to the heater wire. The routine is then returned to the phase difference measurement (Block 34), and the control sequence continues with the display blinking and with the duty cycle reduced.

Figure 7:
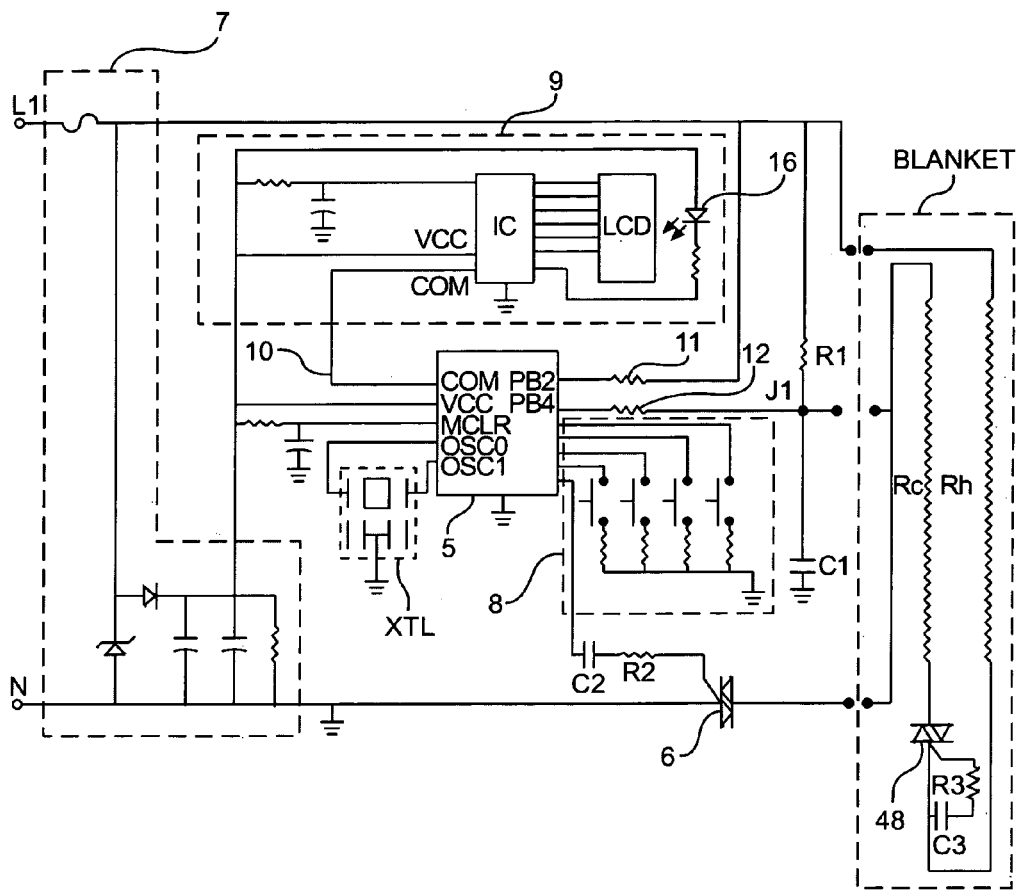
FIG. 7 is an electrical schematic illustrating a second embodiment of the invention.

In an alternate embodiment, the heater current is routed through the core in the opposite direction so that the electromagnetic field (EMF) is cancelled. Referring to the circuit diagram of FIG. 7, the triac 6 powers the heater by first connecting to the junction end of the core wire. The otherwise free end of the core wire is switched to the heater wire with another triac 48. The gate of triac 48 derives current through a series connected capacitor C3 and resistor R3 that are in series with the heater resistor when the triac 48 is open. Upon switching at the zero crossing, the gate capacitor C3 and the gate resistor R3 are shorted, and the holding current is sufficient to keep the triac on until the next zero cross, when it switches on again. The triac 48, resistor R3 and capacitor C3 act as a passive switch and turn on with the main power control triac 6. In this way, no additional or separate control signal is needed to switch the second triac 48. Therefore, a three conductor, as opposed to a four conductor, control cord can be used. When the main power control triac 6 is not on, then the core is isolated from the neutral N by the phase setting capacitor C1, and isolated to the high voltage L1 by the phase setting resistor R1 and the NTC layer. The phase measurement is only available during the off mode. The control would therefore periodically turn off to make a measurement.

Figure 10:
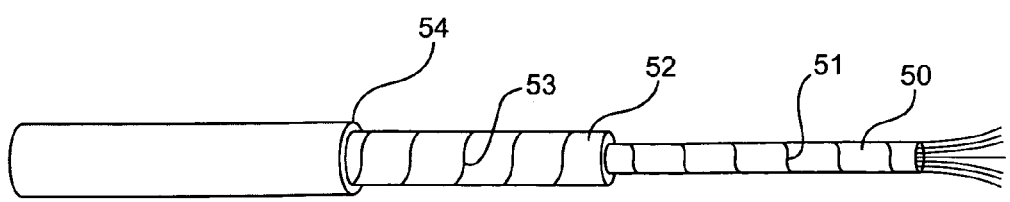
FIG. 10 is a perspective view of the wire used in the third embodiment.

In a third embodiment the heater wire, illustrated in FIG. 10, includes a heater conductor 51 that is made of an alloy having a high temperature coefficient of resistance, a Nickel alloy for example, and is connected to a separate phase shift circuit for detecting the average temperature of the wire. The control circuit, shown in FIG. 8, includes three zero cross detector circuits to monitor both the average temperature and the hottest temperature of the wire. Referring to FIG. 10 a heater conductor 51 is helically wound around a low shrink polyester fiber core 50. As with the second embodiment an NTC polymer layer 52 is extruded over the inner conductor and core and a sensor, pickup, wire 53 is counter wound over the NTC layer. A PVC sheath 54 is extruded over the dual wound assembly as an insulative cover. The sensor wire 53 can be the same material as the heater wire or can be of a different alloy and may be treated to have an interface chemically compatible with the NTC material.

Figure 8:
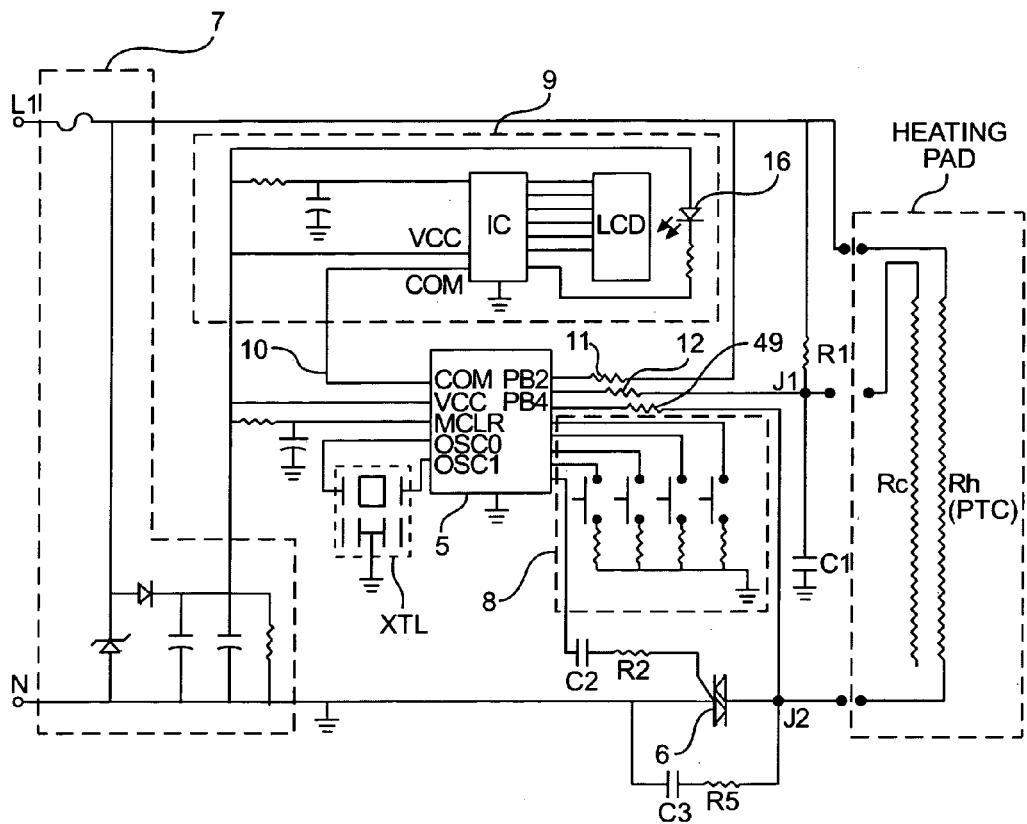
FIG. 8 is an electrical schematic illustrating a third embodiment of the control circuit.

Referring to FIG. 10 and the circuit diagram of FIG. 8, the third embodiment of the invention is now described in greater detail. The heater wire conductor 51 is preferably made of a Nickel alloy that has a significant change in resistance with temperature and is considered a PTC alloy having a positive resistance change with an increase in temperature. An alloy of 95% Nickel has a coefficient of resistance of 0.45% per ° C. One end of the heater conductor Rh(PTC) is connected to the triac 6 electrode at junction J2, the other end is attached to L1 of the AC main. The PTC phase shifter is set up with a series connected capacitor C3 and resistor R5 across the triac contacts so that when the triac is open a phase shift proportional to the heater conductor resistance Rh is set up at junction J2. As the temperature of the heater wire Rh increases, so does the resistance, and the PTC phase shift when the triac is open also increases. During the triac open cycle, the phase at J2 is input to the integrated circuit 5 through a third zero cross resistor 49 and detector circuit. The resistance change of the heater conductor Rh is linear as opposed to the larger non-linear change of the NTC resistance; it is also a smaller change than the NTC resistance and is also in the opposite direction.

Figure 9:
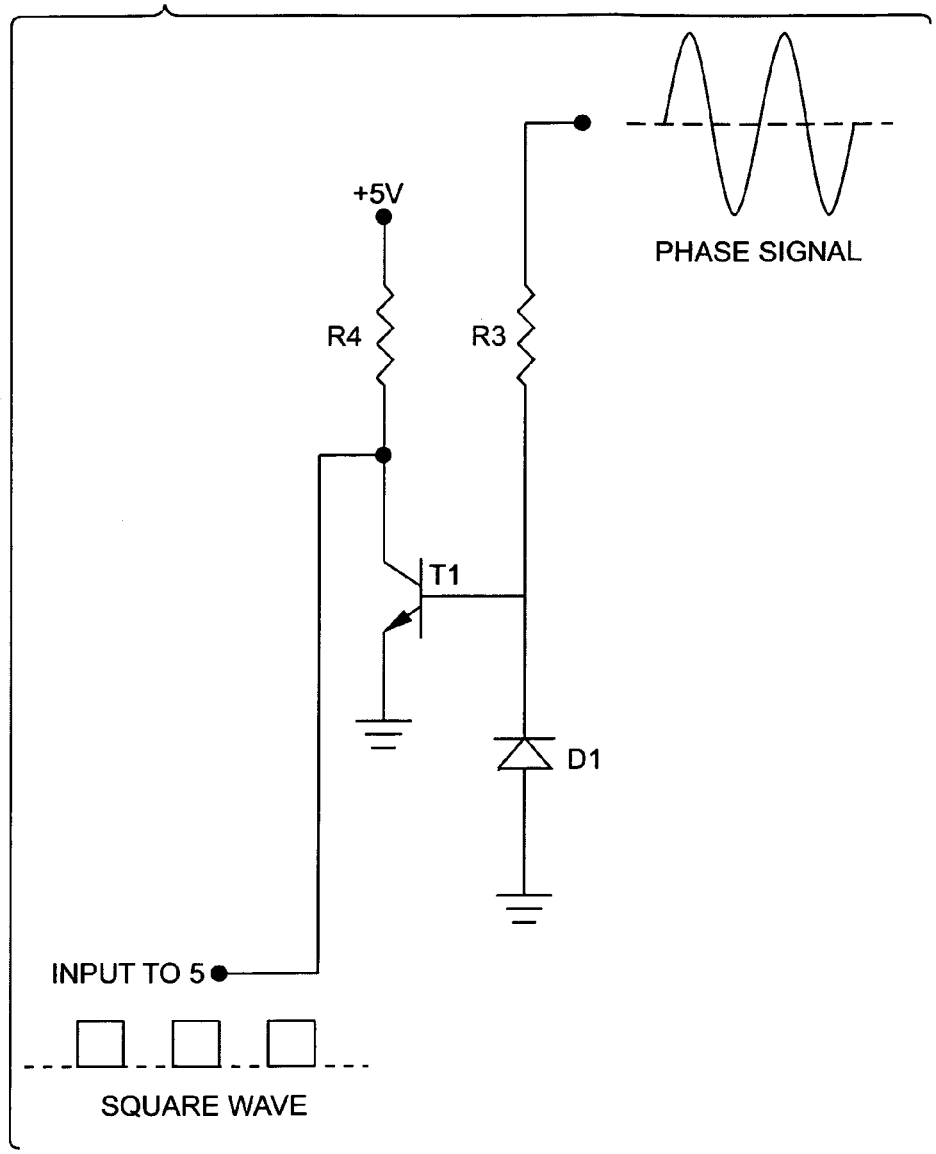
FIG. 9 is an electrical schematic illustrating an accurate zero cross circuit.

Consider a heating pad operating from a room temperature of 20° C. to a high temperature of the wire of 100° C., an 80° C. change causing the heater wire resistance Rh to have a 36% increase in resistance for the alloy described above. A standard size 50 watt heating pad used for relaxing sore muscles may have a heater conductor Rh resistance of 287 ohms at room temperature of 68° F. (20° C.), and with a phase shifter capacitor C3 of 0.47 uF and series resistor R5 of 22 ohms, the circuit is mostly resistive and will exhibit a phase shift of 2.94° angle or 130 usec time shift at J2. As the heating pad gets hot and the wire increases to 212° F. (100° C.), the heater wire resistances increases by 36% or 390 ohms, effecting a phase shift of 3.93° angle or 181 usec time shift. With a 4 Meg HZ, clock the time resolution is 16 us and the PTC phase shift can control the high limit at 176 usec off and 160 usec on. Since the time base resolution is short, 16 usec only, an accurate zero cross measurement is necessary. The zero cross circuit is shown in the circuit drawing of FIG. 8 as a resistor 49; however, to achieve the accuracy needed to distinguish 16 usec intervals, a more precise circuit is used. FIG. 9 shows an active zero cross circuit that converts the sinusoidal signal at the phase shifter junction, J2 for example, to a sharp square wave that crosses the threshold of the input port of the integrated circuit 5 at a steep angle in a short time period. Referring to FIG. 5, series connected resistor R3 and diode D1 form a voltage divider to bias the NPN transistor T1. When the transistor switches on, the collector of transistor T1 is pulled to essentially ground (i.e., a logic low); when T1 opens, R4 pulls the collector and the input to the input port of the integrated circuit 5 up to about +5 volts (i.e., a logic high), resulting in a square wave that can be accurately detected by the integrated circuit 5. Each of the zero cross circuits of FIG. 8 represented by resistors 11, 12 and 49 can be replaced by the circuit of FIG. 9. The output signal from the detector resistor 11 sets at the zero crossing the time base of the power main 60 Hz AC; the zero crossing from the detector resistor 12 measures, in time, the zero cross from the NTC phase shifter that is relative to the hottest spot of the heating pad; and the zero crossing from the detector resistor 49 measures, in time, the zero cross from the phase shifter on the PTC heating element to determine the average temperature and to provide a stable high temperature limit.

Figure 11A:
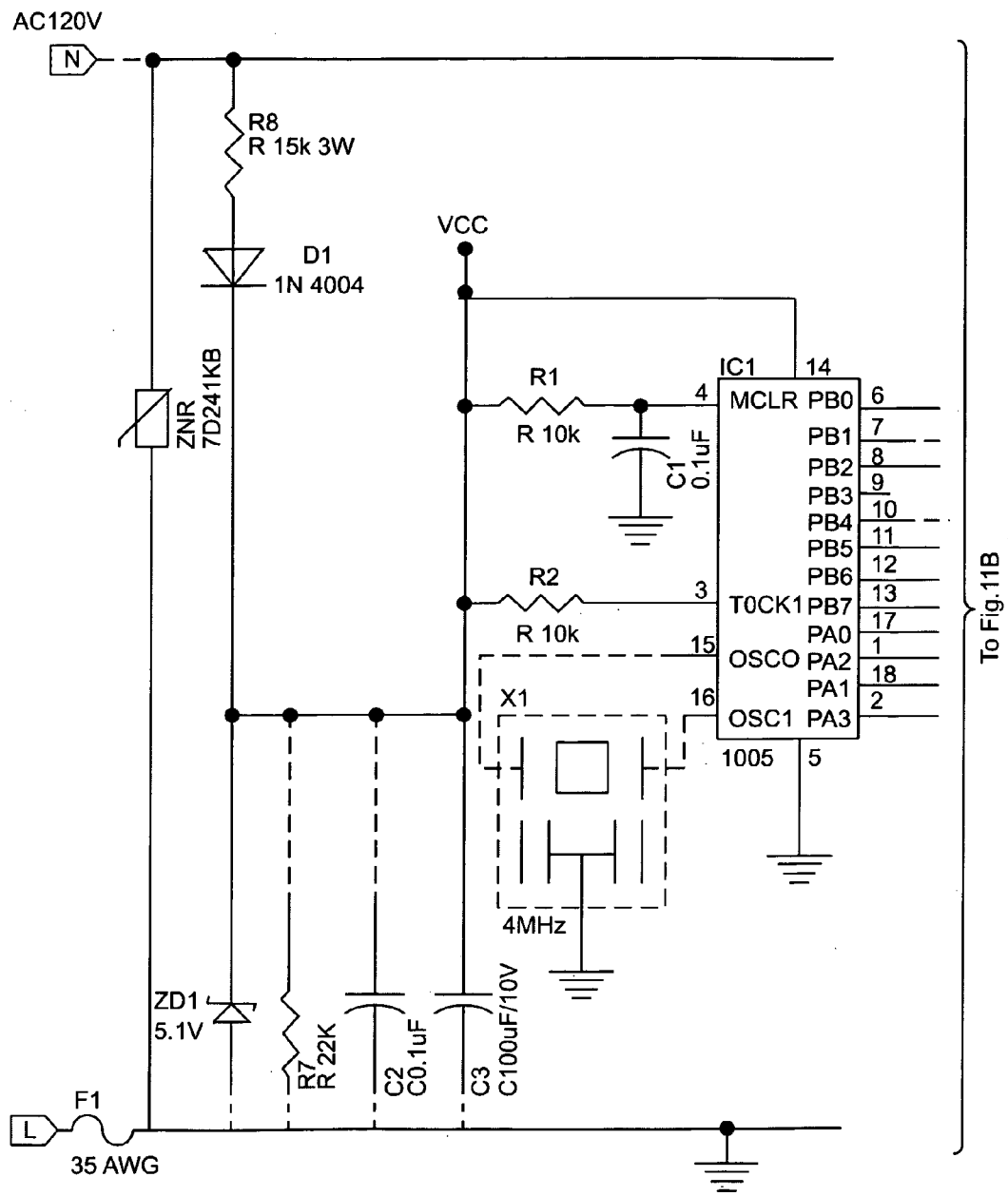
FIG. 11 is a detailed electrical schematic illustrating a preferred form of the control circuit of the present invention.
Figure 11B:
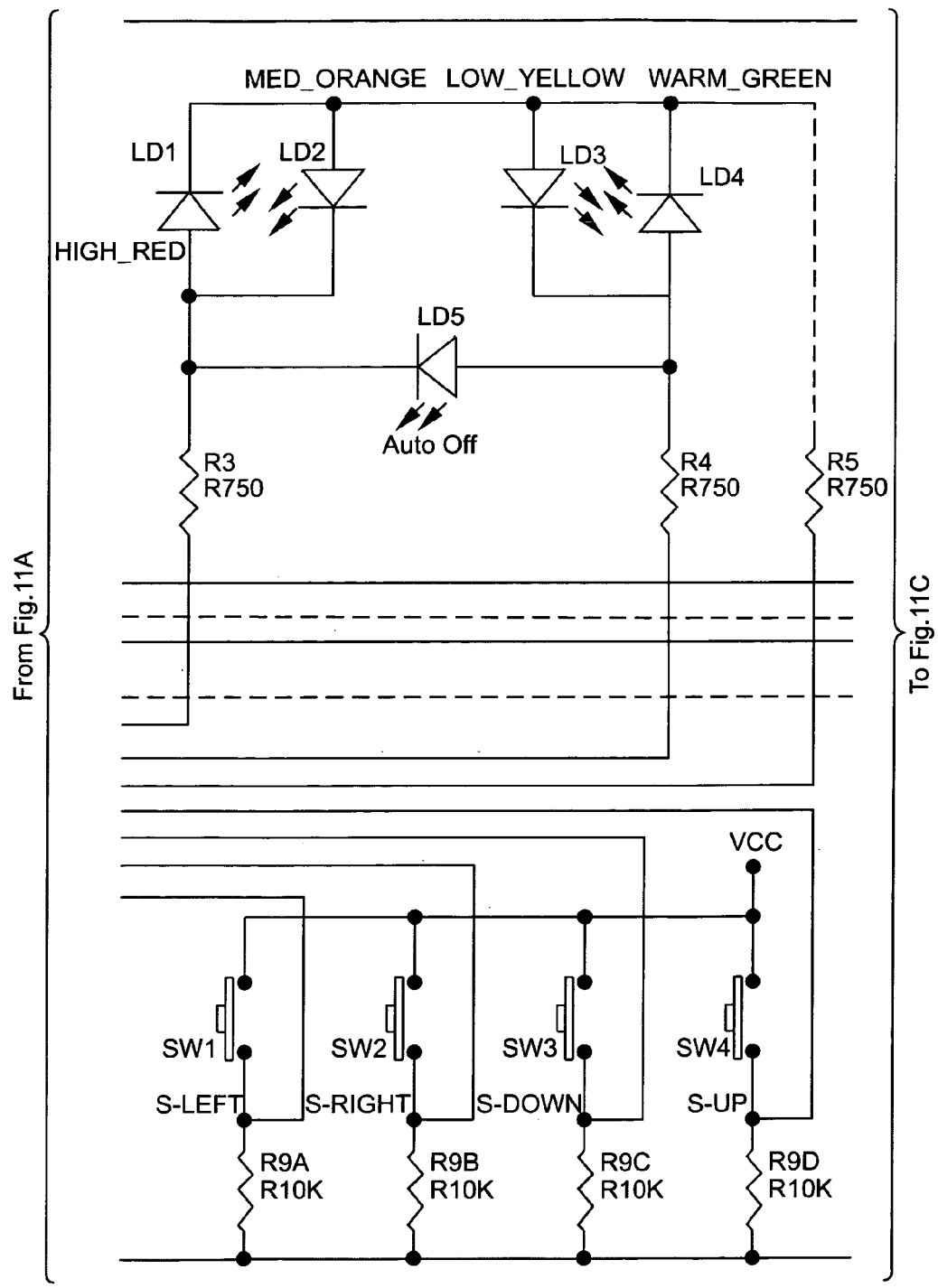
Figure 11C:
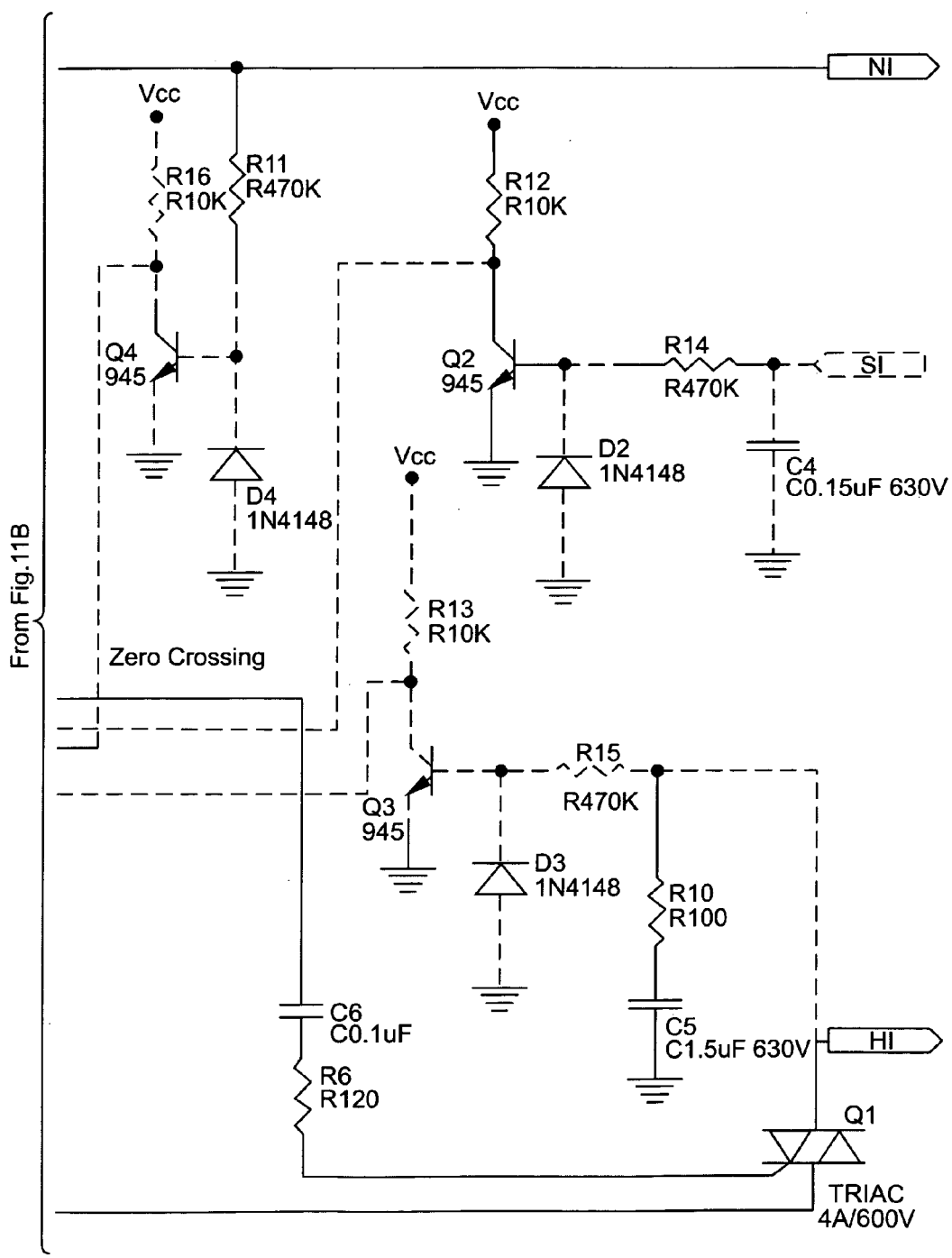

A preferred form of the control circuit, especially for use with the heater wire shown in FIG. 10 and described previously, each of which is formed in accordance with the present invention, is shown in FIG. 11. Part numbers and component values are provided next to each component shown in the figure, and correspondence between the circuit shown in FIG. 11 and those shown in FIGS. 2, 7 and 8 will be evident to those skilled in the art. The microprocessor (microcontroller) corresponds to integrated circuit 5 in the earlier schematics, and is preferably the aforementioned Part No. MDT2010ES. The earlier shown display drive circuit (IC) is configured as part of the programmed microprocessor (microcontroller). The LCD shown earlier corresponds in FIG. 11 to a series of light emitting devices, LD1–LD5. The zero crossing detector circuits are preferably implemented with the circuit configuration shown in FIG. 9, and are shown in FIG. 11 as the circuits comprising NPN transistors Q2–Q4 and their related discrete components. A 4 MHz crystal oscillator is used as the external oscillator for the microprocessor (microcontroller).

The preferred source code used for programming the microprocessor (microcontroller), which is preferably Part No. MDT2010ES mentioned previously, is provided herewith in the annexed appendix and is incorporated herein as part of the disclosure of the invention.

It is conceivable that other combinations of the elements described within this disclosure are possible and within the scope of this invention. The inner conductive polymer layer previously described as being an insulator in the first embodiment and having an NTC characteristic in the second and third embodiment could also be made of a thermally sensitive conductive compound having a PTC characteristic. It has been demonstrated that the phase shift can be measured to have an increasing or decreasing nature and in the case of the third embodiment can have both an increasing and a decreasing signal and a linear and a nonlinear character.

Several embodiments of the invention have been described herein with references to the illustrative drawings to convey an understanding of the invention. Other configurations and embodiments that may include modifications and enhancements will become apparent to those skilled in the art and are considered within the scope or spirit of the invention.

What is claimed is:
1. In combination:
   a heater wire, which comprises:
   a heating conductor having a predetermined resistance;
   a sensing conductor;
   a polymer layer interposed between the heating conductor and the sensing conductor; and
   an outer insulative layer covering the heating conductor, polymer layer and sensing conductor; and
   a control circuit for controlling an AC (alternating current) power signal applied to the heater wire, the control circuit comprising:
   a capacitor, the capacitor being coupleable to one polarity of the AC power signal;
   a resistor connected in series with the capacitor and to an opposite polarity of the AC power signal, the resistor being connected to the capacitor to define a junction thereat, one end of the sensing conductor being coupled to the junction of the resistor and capacitor, the junction exhibiting a phase shifted AC power signal when power is applied to the heater wire and control circuit;
   a first zero cross detector which detects the zero crossing of the AC power signal and generates a first zero cross signal in response thereto;
   a second zero cross detector which detects the zero crossing of the phase shifted AC power signal exhib- ited at the junction of the resistor and capacitor and which generates a second zero cross signal in response thereto;

a time difference determinator circuit responsive to the first zero cross signal and the second zero cross signal and which determines the time difference between the zero crossing of the AC power signal and the zero crossing of the phase shifted AC power signal and generates a control signal in response thereto; and a switch responsive to the control signal which controls the duty cycle of the AC power signal provided to the heater wire in response thereto.

2. A combination as defined by claim 1, wherein the polymer layer of the heater wire includes polyethylene having a melt temperature of less than about 155 degrees C.

3. A combination as defined by claim 1, wherein the polymer layer of the heater wire is semi-conductive and has a negative temperature coefficient (NTC) of resistance.

4. A combination as defined by claim 1, wherein the polymer layer of the heater wire is semi-conductive and has a positive temperature coefficient (PTC) of resistance.

5. In combination:
a heater wire, which comprises:
a heating conductor having a predetermined resistance;
a sensing conductor;
a polymer layer interposed between the heating conductor and the sensing conductor; and
an outer insulative layer covering the heating conductor, polymer layer and sensing wire; and
a control circuit for controlling an AC (alternating current) power signal to the heater wire, the control circuit comprising:
a first capacitor, the first capacitor being coupleable to one polarity of AC power signal;
a first resistor connected in series with the first capacitor and to an opposite polarity of the AC power signal, the first resistor being connected to the first capacitor to define a first junction thereat, one end of the sensing conductor being coupled to the first junction of the first resistor and first capacitor, the first junction exhibiting a first phase shifted AC power signal when power is applied to the heater wire and control circuit;
a first zero cross detector which detects the zero crossing of the AC power signal and generates a first zero cross signal in response thereto;
a second zero cross detector which detects the zero crossing of the first phase shifted AC power signal exhibited at the first junction of the first resistor and first capacitor and which generates a second zero cross signal in response thereto;
a second capacitor;
a second resistor, the second resistor being connected in series with the second capacitor to define a series connection therewith, the series connection having a first end and an opposite second end, the first end of the series connection of the second capacitor and the second resistor being coupleable to said one polarity of the AC power signal, and the second end of the series connection of the second capacitor and the second resistor being coupleable to the heating conductor of the heater wire and defining therewith a second junction, the second junction exhibiting a second phase shifted AC power signal when power is applied to the heater wire and control signal;
a third zero cross detector which detects the zero crossing of the second phase shifted AC power signal exhibited at the second junction of the series connection of the second capacitor and the second resistor and which generates a third zero cross signal in response thereto;

a time difference determinator circuit responsive to the first zero cross signal and the second zero cross signal and which determines the time difference between the zero crossing of the AC power signal and the zero crossing of the first phase shifted AC power signal, and which is further responsive to the first zero cross signal and the third zero cross signal and further determines the time difference between the zero crossing of the AC power signal and the zero crossing of the second phase shifted AC power signal, the time difference determinator circuit generating a control signal in response thereto; and a switch responsive to the control signal which controls the duty cycle of the AC power signal provided to the heater wire in response thereto.

6. A combination as defined by claim 5, wherein the polymer layer of the heater wire includes polyethylene having a melt temperature of less than about 155 degrees C.

7. A combination as defined by claim 5, wherein the polymer layer of the heater wire is semi-conductive and has a negative temperature coefficient (NTC) of resistance.

8. A combination as defined by claim 5, wherein the polymer layer of the heater wire is semi-conductive and has a positive temperature coefficient (PTC) of resistance.

9. A combination as defined by claim 5, wherein the time difference determinator circuit includes a microprocessor which determines the time difference between the zero crossing of the AC power signal and the zero crossing of the first phase shifted AC power signal for determining the temperature of the heater wire relative to the hottest portion of the heater wire.

10. A combination as defined by claim 5, wherein the time difference determinator circuit includes a microprocessor which determines the time difference between the zero crossing of the AC power signal and the zero crossing of the second phase shifted AC power signal for determining the average temperature of the heater wire.

11. A method of monitoring and controlling a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor, which comprises the steps of:
providing an AC (alternating current) power signal to the heater wire;
phase shifting the AC power signal in response to a change in resistance of the polymer layer of the heater wire and generating a phase shifted AC power signal in response thereto;
detecting the zero crossing of the AC power signal and generating a first zero crossing signal;
detecting the zero crossing of the phase shifted AC power signal and generating a second zero crossing signal in response thereto;
determining the time difference between the zero crossing of the AC power signal and the zero crossing of the phase shifted AC power signal in response to the first zero crossing signal and the second zero crossing signal and generating a control signal in response thereto; and
controlling the duty cycle of the AC power signal provided to the heater wire in response to the control signal.

12. A method as defined by claim 11, wherein the polymer layer of the heater wire includes polyethylene having a melt temperature of less than about 155 degrees C.

13. A method as defined by claim 11, wherein the polymer layer of the heater wire is semi-conductive and has a negative temperature coefficient (NTC) of resistance.

14. A method as defined by claim 11, wherein the polymer layer of the heater wire is semi-conductive and has a negative temperature coefficient (NTC) of resistance.

15. A method as defined by claim 11, wherein the polymer layer of the heater wire is semi-conductive and has a positive temperature coefficient (PTC) of resistance.

16. A method of monitoring and controlling a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor, which comprises the steps of:
   providing an AC (alternating current) power signal to the heater wire;
   phase shifting the AC power signal in response to a change in resistance of the polymer layer of the heater wire and generating a first phase shifted AC power signal in response thereto;
   phase shifting the AC power signal in response to a change in resistance of the heating conductor of the heater wire and generating a second phase shifted AC power signal in response thereto;
   detecting the zero crossing of the AC power signal and generating a first zero crossing signal;
   detecting the zero crossing of the first phase shifted AC power signal and generating a second zero crossing signal in response thereto;
   detecting the zero crossing of the second phase shifted AC power signal and generating a third zero crossing signal in response thereto;
   determining the time difference between the zero crossing of the AC power signal and the zero crossing of the first phase shifted AC power signal in response to the first zero crossing signal and the second zero crossing signal, and determining the time difference between the zero crossing of the AC power signal and the zero crossing of the second phase shifted AC power signal in response to the first zero crossing signal and the third zero crossing signal, and generating a control signal in response thereto; and
   controlling the duty cycle of the AC power signal provided to the heater wire in response to the control signal.

17. A method as defined by claim 16, wherein the polymer layer of the heater wire includes polyethylene having a melt temperature of less than about 155 degrees C.

18. A method as defined by claim 16, wherein the polymer layer of the heater wire is semi-conductive and has a positive temperature coefficient (PTC) of resistance.

19. A method as defined by claim 18, wherein the heating conductor has a positive temperature coefficient (PTC) of resistance.

20. A method of monitoring and controlling a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor, which comprises the steps of:
   providing an AC (alternating current) power signal to the heater wire;
   generating a phase shifted AC power signal at a connection to the sensing conductor of the heater wire;
   detecting the zero crossing of the AC power signal and generating a first zero crossing signal;
   detecting the zero crossing of the phase shifted AC power signal and generating a second zero crossing signal in response thereto;
   determining if the time difference between the zero crossing of the AC power signal and the zero crossing of the phase shifted AC power signal in response to the first zero crossing signal and the second zero crossing signal is approximately zero and generating a control signal in response thereto; and
   limiting the AC power signal provided to the heater wire in response to the control signal.

21. A method as defined by claim 20, wherein the polymer layer of the heater wire includes polyethylene having a melt temperature of less than about 155 degrees C.

22. A method as defined by claim 20, wherein the polymer layer of the heater wire is semi-conductive and has a negative temperature coefficient (NTC) of resistance.

23. A method as defined by claim 20, wherein the polymer layer of the heater wire is semi-conductive and has a positive temperature coefficient (PTC) of resistance.

24. A control circuit for controlling an AC (alternating current) power signal applied to a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor, the control circuit comprising:
   a phase shift circuit coupled to the sensing conductor of the heater wire and generating a phase shifted AC power signal;
   a first zero cross detector which detects the zero crossing of the AC power signal and generates a first zero cross signal in response thereto;
   a second zero cross detector which detects the zero crossing of the phase shifted AC power signal and which generates a second zero cross signal in response thereto;
   a time difference determinator circuit responsive to the first zero cross signal and the second zero cross signal and which determines the time difference between the zero crossing of the AC power signal and the zero crossing of the phase shifted AC power signal and generates a control signal in response thereto; and
   a switch responsive to the control signal which controls the duty cycle of the AC power signal provided to the heater wire in response thereto.

25. A control circuit for controlling an AC (alternating current) power signal applied to a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor, the control circuit comprising:
   a first phase shift circuit coupled to the sensing conductor of the heater wire and generating a first phase shifted AC power signal;
   a second phase shift circuit coupled to the heating conductor of the heater wire and generating a second phase shifted AC power signal;

a first zero cross detector which detects the zero crossing of the AC power signal and generates a first zero cross signal in response thereto;

a second zero cross detector which detects the zero crossing of the first phase shifted AC power signal and which generates a second zero cross signal in response thereto;

a third zero cross detector which detects the zero crossing of the second phase shifted AC power signal and which generates a third zero cross signal in response thereto;

a time difference determinator circuit responsive to the first zero cross signal and the second zero cross signal and which determines the time difference between the zero crossing of the AC power signal and the zero crossing of the first phase shifted AC power signal, and being further responsive to the first zero cross signal and the third zero cross signal and which further determines the time difference between the zero crossing of the AC power signal and the zero crossing of the second phase shifted AC power signal, the time difference determinator circuit generating a control signal in response thereto; and a switch responsive to the control signal which controls the duty cycle of the AC power signal provided to the heater wire in response thereto.

26. A control circuit for controlling an AC (alternating current) power signal applied to a heater wire, the heater wire including a heating conductor having a predetermined resistance, a sensing conductor, a polymer layer interposed between the heating conductor and the sensing conductor, and an outer insulative layer covering the heating conductor, polymer layer and sensing conductor, the control circuit comprising:

a phase shift circuit coupled to the sensing conductor of the heater wire and generating a phase shifted AC power signal;

a first zero cross detector which detects the zero crossing of the AC power signal and generates a first zero cross signal in response thereto;

a second zero cross detector which detects the zero crossing of the phase shifted AC power signal and which generates a second zero cross signal in response thereto, a time difference determinator circuit responsive to the first zero cross signal and the second zero cross signal and which determines if the time difference between the zero crossing of the AC power signal and the zero crossing of the phase shifted AC power signal is approximately zero and generating a control signal in response thereto; and a switch responsive to the control signal which limits the AC power signal provided to the heater wire in response thereto.

27. In combination:

a heater wire, which comprises:

a heating conductor having a predetermined resistance;

a sensing conductor;

a polymer layer interposed between the heating conductor and the sensing conductor; and an outer insulative layer covering the heating conductor, polymer layer and sensing conductor; and a control circuit for controlling an AC (alternating current) power signal applied to the heater wire, the control circuit comprising:

a capacitor, the capacitor being coupleable to one polarity of the AC power signal;

a resistor connected in series with the capacitor and to an opposite polarity of the AC power signal, the resistor being connected to the capacitor to define a junction thereat, one end of the sensing conductor being coupled to the junction of the resistor and capacitor, the junction exhibiting a phase shifted AC power signal when power is applied to the heater wire and control circuit;

a first zero cross detector which detects the zero crossing of the AC power signal and generates a first zero cross signal in response thereto;

a second zero cross detector which detects the zero crossing of the phase shifted AC power signal exhibited at the junction of the resistor and capacitor and which generates a second zero cross signal in response thereto;

a time difference determinator circuit responsive to the first zero cross signal and the second zero cross signal and which determines if the time difference between the zero crossing of the AC power signal and the zero crossing of the phase shifted AC power signal is approximately zero and generating a control signal in response thereto; and a switch responsive to the control signal which limits the AC power signal provided to the heater wire in response thereto.

* * * * *